United States Patent [19]

Matsuno et al.

[11] 4,396,422
[45] Aug. 2, 1983

[54] PROCESS FOR PRODUCING IRON AND REFRACTORY MATERIAL

[76] Inventors: Hiroshi Matsuno, 2-23, Kotake-cho, Nerima-Ku, Tokyo; Hiroyuki Sasaki, 19-8, Tomigaya 2-Chome, Shibuya-Ku, Tokyo; Hideaki Shibuya, 1556, Matsudasoryo, Matsuda-Cho, Ashigarakamigun, Kanagawa, all of Japan

[21] Appl. No.: 356,073

[22] Filed: Mar. 8, 1982

[51] Int. Cl.$^3$ .............................................. C21B 3/04
[52] U.S. Cl. ........................................... 75/24; 75/27; 75/30; 75/40; 106/104; 106/117
[58] Field of Search .................... 75/27, 40, 30, 24; 106/104, 117

[56] References Cited

U.S. PATENT DOCUMENTS 4,047,942  9/1977  Clark et al. .............................. 75/27

FOREIGN PATENT DOCUMENTS 617415  7/1978  U.S.S.R. ............................... 106/104
791781  1/1981  U.S.S.R. ................................. 75/24

*Primary Examiner*—M. J. Andrews
*Attorney, Agent, or Firm*—William A. Drucker

[57] ABSTRACT

There is disclosed a process for producing iron and refractory material for use as a raw material for a refractory brick and as an aggregate for a castable refractory product. A mixture of aluminum smelting residue and scale is introduced into a furnace. The mixture is melted in the furnace and a thermit reaction is generated. After the completion of the thermit reaction, a molten iron and a molten slag are cooled. Particularly the molten slag is gradually cooled. The slag is crushed to form the refractory material.

Alternatively, in order to produce iron and alumina cement, quicklime and/or limestone are further introduced into the furnace. The molten slag is cooled rapidly to form a clinker. The clinker is crushed to a powder size to form the alumina cement.

7 Claims, No Drawings

PROCESS FOR PRODUCING IRON AND REFRACTORY MATERIAL

BACKGROUND OF THE INVENTION

1. Field of the Invention

This invention relates to a process for producing iron such as steel and cast iron and a refractory material which process makes effective use of aluminum smelting residue produced as a by-product in the manufacture of aluminum and a scale produced as a by-product in the processing of iron products.

2. Prior Art

Aluminum smelting residue is formed on molten aluminum in the refining of metallic aluminum, in a melting treatment of scrap aluminum and in the manufacture of an aluminum alloy. The aluminum smelting residue is composed mainly of alumina and metallic aluminum. The aluminum smelting residue is pulverized or crushed and then screened so that part of the pulverized metallic aluminum is recovered. Part of the aluminum smelting residue from which part of the metallic aluminum has been removed is used for the purpose of heat insulation and slag formation, and the remainder is discarded. When the discarded aluminum smelting residue is exposed to rain water, aluminum nitride and aluminum carbide contained in the aluminum smelting reside react with water to produce ammonia gas and hydrocarbon gas which give rise to an environmental pollution.

Scale is formed during the drawing of a steel billet in a continuous casting of molten steel, during the rolling or the forging of a steel billet or ingot, and during the heat treatment of a steel billet or ingot in a furnace for a subsequence rolling or forging operation. The scale is in the form of a film or sheet and contains iron oxide as a main component. The scale is reduced and reused as iron source. It is not thought, however, that this scale is used effectively.

SUMMARY OF THE INVENTION

It is therefore an object of this invention to provide a process for producing iron and a refractory material which process makes effective use of aluminum smelting residue and scale produced as industrial by-products which are generally considered to be less useful.

Another object is to provide such a process in which a required heat energy is substantially saved.

A further object is to provide such a process in which industrial wastes are not produced.

A still further object is to provide such a process for producing iron and the refractory material which is used as a raw material for a refractory brick and also is used as an aggregate for a castable refractory product.

A further object is to provide a process for producing iron and alumina cement for use as a refractory material.

According to the present invention, a mixture of aluminum smelting residue and scale is introduced into a furnace. In the case where alumina cement is to be produced as the refractory material, quicklime and/or limestone is further introduced into the furnace in which the above-mentioned raw materials are melted to cause a thermit reaction. After the completion of the thermit reaction, the molten materials are cooled to provide iron and the refractory material.

DETAILED DESCRIPTION OF THE INVENTION

Aluminum smelting residue, used as one of the raw materials for the process of the present invention, is formed in the refining of aluminum, a melting treatment of scrap aluminum and in the manufacture of an aluminium alloy. The aluminum smelting residue is subjected to pulverization and screening. In order to ensure a positive thermit reaction, the aluminum smelting residue should preferably contain more than 21% metallic aluminum.

The scale, which is another raw material for the present process, generally contains more than 98% iron oxide. The proportions of FeO, $Fe_3O_4$ and $Fe_2O_3$ in the iron oxide vary with the conditions of the formation of the iron oxide.

In the case where alumina cement is to be produced as the refractory material, quicklime and/or limestone are added as a raw material.

An important feature of the present invention is the use of a well known thermit reaction between metallic aluminum and iron oxide. The reaction formula of the thermit reaction is as follows:

$$2Al + Fe_2O_3 = 2Fe + Al_2O_3 - \Delta H = 194{,}800 \text{ cal/mol } Al_2O_3 \tag{1}$$

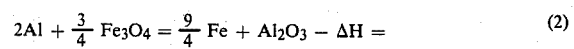
$$2Al + \frac{3}{4} Fe_3O_4 = \frac{9}{4} Fe + Al_2O_3 - \Delta H = 189{,}800 \text{ cal/mol } Al_2O_3 \tag{2}$$

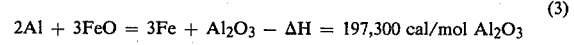
$$2Al + 3FeO = 3Fe + Al_2O_3 - \Delta H = 197{,}300 \text{ cal/mol } Al_2O_3 \tag{3}$$

In the present invention, the thermit reaction occurs between the metallic aluminum in the aluminum smelting residue and the iron oxide in the scale. Due to the thermit reaction, the iron oxide in the scale is reduced, and the metallic aluminum in the aluminum smelting residue is oxidized. As a result, the reduced iron and the refractory material containing alumina are produced.

The heat generated by the thermit reaction is used as a heat source for melting the raw materials and the reaction products. Therefore, an external heat energy to be used can be substantially saved.

Another important feature of the present invention is that the thermit reaction is controlled to an appropriate degree by alumina and other components in the aluminum smelting residue. Generally, the thermit reaction is carried out for a short period of time and generates a large amount of heat. Therefore, if the thermit reaction is carried out in a furnace, the furnace is damaged. In the present invention, the above-mentioned alumina and other components do not participate in the thermit reaction so that they suitably restrain the thermit reaction to prevent the furnace from being damaged, thereby ensuring that the process can be carried out in a stable manner. When quicklime and/or limestone are added, they also have a restraining action on the thermit reaction.

The present invention is used for a process for producing iron and a refractory material for use as a raw material for a refractory brick and also as an aggregate for a castable refractory product. In this case, a mixture of aluminum smelting residue and scale is introduced into a furnace in which the mixture is melted and the thermit reaction is carried out. After the completion of the thermit reaction, the molten iron and the molten slag are cooled. Particularly, the molten slag is gradually cooled so that the crystals of α-alumina and spinel in the slag are caused to grow. The slag thus gradually cooled is crushed by a crusher into a particle size of about 1 to 4 mm. The crushed slag is used as a raw material for a refractory brick. The crushed slag may be further pulverized into powder. The crushed or pulverized slag is also used as an aggregate for a castable refractory product.

The above-mentioned refractory material, which is obtained using the aluminum smelting residue produced particularly in the melting treatment of scrap aluminum and in the manufacture of an aluminum alloy, is superior to a refractory material which is obtained from crushed electrofused alumina. More specifically, such aluminum smelting residue generally contains α-alumina and a small amount of magnesia. Part of the alumina and the magnesia are chemically bonded together at high temperatures to form spinel ($MgO.Al_2O_3$). Therefore, the resultant refractory material contains α-alumina and this spinel. Due to the presence of spinel, its refractory properties are improved, and its apparent porosity is reduced, and its bulk density is increased. Thus, the characteristics of the refractory material are improved. When the content of magnesia in the aluminum smelting residue is too small, magnesia may be introduced into the furnace.

In most cases, the aluminum smelting residue contains silica and oxides of heavy metals such as Fe, Cu, Cr, Mn and Zn. If the resultant refractory material contains silica and these oxides, its refractory properties are adversely affected. When it is desired to produce the refractory material having high refractory properties, the amount of metallic aluminum contained in the aluminum smelting residue is increased enough to reduce the above-mentioned silica and metal oxides as well as the scale. As a result, the silica and the oxides of the heavy metals are reduced by the metallic aluminum to form silicon and heavy metals. The silicon and heavy metals are fused into the molten iron. As a result, the content of these components in the resultant refractory material is substantially reduced.

The present invention is used for a process for producing iron and alumina cement as a refractory material. In this case, a mixture of aluminum smelting residue and scale is introduced into a furnace. Quicklime and/or limestone are further introduced into the furnace. The quicklime and/or limestone may be mixed with the aluminum smelting residue and the scale, and then the mixture may be introduced into the furnace. Alternatively, the quicklime and/or limestone may be introduced to the furnace after the mixture of aluminum smelting residue and scale is charged into the furnace. In the furnace, the above raw materials are melted, and the thermit reaction occurs. After the thermit reaction, the molten iron and the molten slag are cooled. Particularly, the molten slag is rapidly cooled to form a clinker containing about 30% amorphous substance. The clinker is pulverized by a ball mill or the like into powder to form alumina cement. The so-produced alumina cement contains as a main component monocalcium aluminate ($CaO.Al_2O_3$) which is produced by a chemical bonding of calcium oxide and alumina.

In the case where the aluminum smelting residue, produced in the melting treatment of scrap aluminum and in the manufacture of an aluminum alloy, is used, such aluminum smelting material contains silica, and the silica reacts with part of alumina and part of calcium oxide to produce gehlenite ($2CaO.Al_2O_3.SiO_2$). It is preferred for certain kinds of alumina cements to contain a small amount of gehlenite to facilitate the forming amorphous substance. In the manufacture of such alumina cement, an additional material containing silica may be introduced into the furnace when the content of silica in the aluminum smelting residue is too small.

Alumina cement of the kind having high refractory properties does not contain gehlenite and oxides of heavy metals such as Fe, Cu, Cr, Mn and Zn. In the production of such alumina cement, the amount of metal aluminum in the aluminum smelting residue is increased enough to reduce silica and oxides of heavy metals in the aluminum smelting residue as well as scale. The silica and the oxides of heavy metals are reduced by the metallic aluminum to form silicon and heavy metals. The silicon and heavy metals are fused into the molten iron. As a result, the content of gehlenite and oxides of heavy metals in the resultant alumina cement is reduced to substantially zero.

The aluminum smelting residue contains aluminum nitride and aluminum carbide. These substances are harmful to alumina cement. More specifically, when water is added to alumina cement which contains these substances, the water reacts with the substances to produce ammonia gas and hydrocarbon gas during the setting of the alumina cement. As a result, the set alumina cement is of a porous structure and therefore has a reduced strength. The alumina cement produced by the process of the present invention contains substantially reduced amounts of the above harmful substances. The reason is that the temperatures of the molten materials in the furnace locally become extremely high due to the thermit reaction so that most of the harmful substances, i.e., aluminum nitride and aluminum carbide are decomposed. When it is desired to further reduce the contents of these harmful substances in the alumina cement, oxygen gas under pressure is blown into the molten slag floating on the molten iron after the completion of the thermit reaction. At this time, AlN is oxidized to form alumina and $NO_2$ gas, and $Al_4C_3$ is oxidized to form alumina and CO and/or $CO_2$ gas.

The present invention will now be illustrated by the following Examples.

EXAMPLE 1

This Example shows a process for producing iron and a refractory material suited for use as a raw material for a refractory brick and for a castable refractory material.

The chemical compositions of the raw materials are shown in Table 1.

TABLE 1

| Aluminum smelting residue | Metallic Al | $Al_2O_3$ | $SiO_2$ | MgO | $Fe_2O_3$ | AlN |
|---|---|---|---|---|---|---|
| | 39.0 | 42.1 | 2.05 | 6.6 | 0.85 | 6.74 |
| Scale | Iron oxide | | | | | |
| | FeO | | $Fe_3O_4$ | | MnO | $SiO_2$ |
| | 35.01 | | 63.69 | | 0.4 | 0.8 |
| | (% by weight) | | | | | |

20 kg of the aluminum smelting residue and 24 kg of the scale were mixed together by a mixer to prepare a mixture of 44 kg. 0.5 kg of crushed electrode scrap was charged into an electric furnace (80 kVA). Then, electric power was supplied to the electric furnace so that an arc was generated between the electrode and the bottom of the electric furnace. After the arc became stable, the mixture was gradually charged into the electric furnace so that the mixture was subjected to the thermit reaction and was melted. Thus, the total amount of the mixture was introduced into the furnace. When the temperature of the mixture reached 2,100° C. after the completion of the thermit reaction, the power supply to the electric furnace was stopped. 20 kg of an insulating material composed mainly of alumina was introduced into the furnace so that the surface of the molten materials was covered with it. In this condition, the reaction product composed of molten iron and molten slag was allowed to be gradually cooled so that the crystals of the alumina and spinel in the slag were allowed to grow. An inspection of the solidified reaction product in the furnace showed that the lower iron and the upper slag were completely separated from each other. The electric furnace was disassembled and the solidified iron and slag were removed therefrom.

The chemical composition of the iron so produced is shown in Table 2.

TABLE 2

| Fe | Al | C | Si | Mn | P | S |
|---|---|---|---|---|---|---|
| 91.7 | 3.12 | 2.51 | 1.29 | 1.02 | 0.013 | 0.009 |
| (% by weight) | | | | | | |

The chemical composition of the slag is shown in Table 3.

TABLE 3

| $Al_2O_3$ | $SiO_2$ | $Fe_2O_3$ | MgO | $Na_2O$ |
|---|---|---|---|---|
| 97.5 | 0.12 | 0.01 | 2.25 | 0.05 |
| (% by weight) | | | | |

The slag was analyzed by X-ray diffraction and it was found that part of $Al_2O_3$ and MgO were chemically combined together to form spinel ($MgO \cdot Al_2O_3$). The mineral compositions of $\alpha\text{-}Al_2O_3$ and $MgO \cdot Al_2O_3$ in the slag are shown in Table 4.

TABLE 4

| $\alpha\text{-}Al_2O_3$ | $MgO \cdot Al_2O_3$ |
|---|---|
| 92 | 7.5 |
| (% by weight) | |

The slag was crushed to a particle size of 4.0 to 2.0 mm, and its apparent porosity and bulk density were measured. The apparent porosity was 2.1% and the bulk density was 3.85. This apparent porosity is less than an apparent porosity of electrofused alumina which is 4.5 to 4.8%, and this bulk density is greater than a bulk density of electrofused alumina which is 3.7.

The weight of the produced iron was 17.1 kg, and the weight of the slag or refractory material was 23.1 kg. The electric power consumed was 42 kWH.

In a conventional process for producing iron by reducing scale by coke or the like, the same amount of iron is produced using an electric power of about 34 kWH. Also, in a conventional process for producing electrofused alumina by reducing bauxite, the same amount of the refractory material is produced using an electric power of about 58 kWH. With these conventional processes, the total electric power of 92 kWH is consumed. Thus, the process of the present invention consumes less electric power in comparison with the conventional processes.

EXAMPLE 2

This Example shows a process for producing iron and alumina cement.

Crushed and screened aluminum smelting residue, scale, and quicklime were prepared as main raw materials. The chemical compositions of these materials are shown in Table 5.

TABLE 5

| Aluminum smelting residue | Metallic Al | $Al_2O_3$ | $SiO_2$ | MgO | $Fe_2O_3$ | AlN |
|---|---|---|---|---|---|---|
| | 30.73 | 49.31 | 2.43 | 3.08 | 1.02 | 9.75 |
| Scale | Iron oxide | | | | | |
| | FeO | | | $Fe_3O_4$ | MnO | $SiO_2$ |
| | 35.01 | | | 63.69 | 0.4 | 0.8 |
| Quicklime | CaO | | | | | |
| | 96.3 | | | | | |
| | (% by weight) | | | | | |

The raw materials were mixed together by a mixer in amounts shown in Table 6 to prepare 200 kg of a mixture.

TABLE 6

| Aluminum smelting residue | Scale | Quicklime | Total |
|---|---|---|---|
| 66 | 92 | 42 | 200 |
| | (kg) | | |

First, 20 kg of the mixture was charged into an electric furnace (80 kVA), and a mixture of powdered metallic aluminum (0.5 kg) and scale (2 kg) was introduced into the furnace so as to be deposited on the first-mentioned mixture. Then, electric power was supplied to an electrode in the electric furnace so that an arc was generated between the electrode and the bottom of the furnace. The mixture of metallic aluminum and scale was ignited by the arc so that a thermit reaction began in this mixture. Subsequently, the heat generated by this thermit reaction causes a thermit reaction in the first-mentioned mixture. The remainder of the first-mentioned mixture was gradually introduced into the furnace while the supply of electric power to the electrode was continued, so that the mixture was subjected to the thermit reaction and was melted. Thus, the total amount of the mixture was charged into the furnace. When the temperature of the molten materials reached 1,650° C. after the completion of the thermit reaction, the furnace was inclined to discharge only the upper molten slag therefrom. When the molten slag was discharged from the furnace, air is blown to it so that it is rapidly cooled to form an alumina cement clinker containing about 30% amorphous substance. The alumina cement clinker was pulverized by a ball mill to form alumina cement.

4 kg of coke powder was supplied to the molten iron in the electric furnace. The coke powder was composed of 85.6 weight percent fixed carbon, 2.2 weight percent volatile matter and 12.2 weight percent ash. The furnace was energized for 10 minutes, and then the molten iron was delivered to a ladle through a taphole in the bottom of the furnace. The molten iron in the ladle was allowed to be cooled and solidified.

The chemical composition of the so produced iron is shown in Table 7.

TABLE 7

| Fe | Al | C | Si | Mn | P | S |
|---|---|---|---|---|---|---|
| 94.8 | 0.20 | 3.38 | 0.91 | 0.41 | 0.05 | 0.01 |

TABLE 7-continued

| Fe | Al | C | Si | Mn | P | S |
|---|---|---|---|---|---|---|
| (% by weight) | | | | | | |

The chemical composition of the alumina cement produced is shown in Table 8.

TABLE 8

| Al$_2$O$_3$ | CaO | SiO$_2$ | Fe$_2$O$_3$ | MgO |
|---|---|---|---|---|
| 62.1 | 32.9 | 1.4 | 0.7 | 1.7 |
| (% by weight) | | | | |

The alumina cement was analyzed by X-ray diffraction. The obtained mineral composition of it is shown in Table 9.

TABLE 9

| CaO.Al$_2$O$_3$ | CaO.2Al$_2$O$_3$ | MgO.Al$_2$O$_3$ | 2CaO.Al$_2$O$_3$.SiO$_2$ |
|---|---|---|---|
| 79.4 | 7.1 | 6.7 | 5.9 |
| (% by weight) | | | |

The results of physical tests of the alumina cement according to JIS. R2521 are shown in Table 10.

TABLE 10

| Setting-Times | Initial | 5 hours and 45 minutes |
|---|---|---|
| | Final | 7 hours and 30 minutes |
| Flexural strength (one day) | | 65 kg/cm$^2$ |
| Compressive strength (one day) | | 540 kg/cm$^2$ |

The results in Table 10 shows that the properties of the alumina cement are quite satisfactory.

The weight of the produced iron was 65 kg, and the weight of the produced alumina cement was 121 kg. The electric power consumed was 65 kWH.

In a conventional process for producing iron by reducing scale by coke or the like, the same amount of iron is produced using an electric power of 129 kWH. Also, in a conventional process for producing alumina cement by electrofusing quicklime and bauxite, the same amount of alumina cement is produced using an electric power of 145 kWH. With these conventional processes, the total electric power of 274 kWH is consumed. Thus, the process of the present invention consumes less electric power in comparison with the conventional processes.

EXAMPLE 3

This Example is presented to show how those components of the aluminum smelting residue which adversely affect the resultant alumina cement are reduced. The alumina cement and iron were produced according to the procedure of Example 2 except that the aluminum smelting residue had a slightly different ratio of components and that oxygen was blown into the molten slag.

0.4 m$^3$ of oxygen under a pressure of 5 kg/cm$^2$ was blown into the molten slag maintained at a temperature of above 1,650° C. The contents of the harmful components, i.e., aluminum nitride and aluminum carbide were reduced as shown in Table 11.

TABLE 11

| | AlN | Al$_4$C$_3$ |
|---|---|---|
| Aluminum smelting residue | 10.03 | 1.26 |
| Slag after the reaction | 0.68 | 0.05 |
| Slag after the oxygen blowing | 0.12 | 0.03 |

TABLE 11-continued

| | AlN | Al$_4$C$_3$ |
|---|---|---|
| (% by weight) | | |

As is clear from Table 11, the harmful components in the slag are reduced to a satisfactory level due to the thermit reaction, and the oxygen blowing operation is effective for reducing the contents of the harmful components.

What is claimed is:

1. A process for producing iron and a refractory material for use as a raw material for a refractory brick and as an aggregate for a castable refractory product, which process comprises the steps of:
   (a) introducing a mixture of aluminum smelting residue and scale into a furnace, said aluminum smelting residue being composed mainly of metallic aluminum and alumina, and said scale being composed mainly of iron oxide;
   (b) melting said mixture in the furnace and generating a thermit reaction between the metallic aluminum in said aluminum smelting residue and the iron oxide in said scale, so that said mixture is formed into molten iron and molten slag;
   (c) cooling said molten iron and said molten slag after the completion of said thermit reaction, said molten slag being gradually cooled to cause crystal growth therein; and
   (d) crushing said slag to particle size or powder size to form the refractory material.

2. A process according to claim 1, in which said aluminum smelting residue contains magnesia.

3. A process according to claim 1, in which a raw material containing magnesia is introduced into said furnace.

4. A process for producing iron and alumina cement as a refractory material, which process comprises the steps:
   (a) introducing a mixture of aluminum smelting residue and scale into a furnace, said aluminum smelting residue being composed mainly of metallic aluminum and alumina, and said scale being composed mainly of iron oxide;
   (b) introducing quicklime and/or limestone into said furnace;
   (c) melting the raw materials introduced into said furnace and generating a thermit reaction between the metallic aluminum in said aluminum smelting residue and the iron oxide in said scale, so that said raw materials are formed into molten iron and molten slag;
   (d) cooling said molten iron and said molten slag after the completion of said thermit reaction, said molten slag being rapidly cooled to form a clinker containing amorphous substance; and
   (e) crushing said clinker to powder to form the alumina cement.

5. A process according to claim 4, in which while said molten slag is maintained at a temperature of above 1,650° C. after the completion of said thermit reaction, oxygen under pressure is blown into said molten slag to reduce the content of those substances which adversely affect the resultant alumina cement.

6. A process according to claim 4, in which said aluminum smelting residue contains silica.

7. A process according to claim 4, in which a raw material containing silica is introduced into said furnace.

* * * * *